United States Patent

[11] 3,581,297

[72] Inventors Michael I. Behr
South Pasadena;
Lewis B. Coon, Jr., Pasadena; Charles E.
Bickel, West Covina, all of, Calif.
[21] Appl. No. 668,529
[22] Filed Sept. 18, 1967
[45] Patented May 25, 1971
[73] Assignee Burroughs Corporation
Detroit, Mich.

[54] BINARY DATA HANDLING SYSTEM
9 Claims, 3 Drawing Figs.

[52] U.S. Cl. ........ 340/174.1
[51] Int. Cl. ........ G11b 5/02, G11b 5/44
[50] Field of Search ........ 340/174.1 (G), 174.1 (H); 346/74

[56] References Cited

UNITED STATES PATENTS

| | | | |
|---|---|---|---|
| 2,972,735 | 2/1961 | Fuller et al. | 340/174.1 |
| 3,092,814 | 6/1963 | Hoagland | 340/174.1 |
| 3,413,625 | 11/1968 | Mitterer et al. | 340/174.1 |

*Primary Examiner*—Bernard Konick
*Assistant Examiner*—Vincent P. Canney
*Attorney*—Christie, Parker & Hale

ABSTRACT: A system for reading binary data recorded on a storage medium as magnetic tape in either of several coding techniques. Specifically, the system is capable of reading either phase encoded data or data recorded in the form of nonreturn-to-zero pulses in which one binary value is represented by a flux reversal in a bit cell and the other binary value is represented by the absence of a flux reversal in a bit cell (hereafter called modified NRZ). A positive threshold detector, a negative threshold detector, and a bipolar peak detector are utilized for recovering the NRZ data and part of the preamble of the phase encoded data. The bipolar peak detector is also employed in the recovery of the phase encoded data itself. To recover the NRZ data and the preamble of the phase encoded data, the output of the positive threshold detector and the bipolar peak detector are combined in one AND circuit and the output of the negative threshold detector and the inverse output of the bipolar peak detector are combined in another AND circuit. To recover the phase encoded data, a signal representing the peak-to-peak amplitude of the read head signal is produced by differentiating it and then separately integrating the two half-cycles of the differential signal. The maximum amplitude of the differentiated signal is limited to suppress noise. The integrated signals are applied to a positive threshold detector and a negative threshold detector, respectively. The output of the positive threshold detector is combined with the output of the bipolar peak detector in one AND circuit and the output of the negative threshold detector is combined with the inverse of the output of the bipolar peak detector in another AND circuit to recover the phase encoded data. To check for errors in the phase encoded data, these outputs are switched and applied to two other AND circuits.

INVENTORS.
MICHAEL I. BEHR
LEWIS B. COON, JR.
CHARLES E. BICKEL
BY Christie, Parker & Hale
ATTORNEYS

PATENTED MAY 25 1971 3,581,297

SHEET 3 OF 3

BINARY DATA HANDLING SYSTEM

BACKGROUND OF THE INVENTION

This invention relates to binary data handling and, more particularly, to the recovery of phase encoded and conventionally encoded binary data from a storage medium.

In recovering phase encoded data from tape, the signal produced by the magnetic read head has an oscillating, approximately sinusoidal wave form. Normally, a positive peak in the read head signal at the center of a bit cell indicates one binary value and a negative peak in the read head signal at the center of a bit cell indicates the other binary value. Each time the binary value of the data recorded on the medium changes in successive bit cells, the read head signal produces an intervening pulse at the cell boundary. The peak amplitude of the read head signal varies substantially as the pulse information pattern changes. For example, the peak amplitude of the read head signal is generally smaller in a bit cell in which the same binary value as the previous bit cell is repeated. Further, the read head signal tends to wander appreciably, i.e., its positive and negative peaks do not remain symmetrical about a reference level. These characteristics cause trouble in processing the phase encoded read head signal, particularly in regard peak amplitude discrimination.

Generally, the read head signal produced in the recovery of conventionally encoded binary data has different characteristics from the read head signal produced for phase encoded data. FAn example of such conventionally encoded binary data is the so-called modified nonreturn-to-zero (NRZ) data in which one binary value is represented by a flux reversal in a bit cell and the other binary value is represented by the absence of a flux reversal in a bit cell. Different techniques have been developed for processing phase encoded data and conventionally encoded data due to their different characteristics. Some tape handling equipment is provided with the capability of accommodating both phase encoded data and conventionally encoded data. Since different techniques are used to process the read head signal of the two types of data, essentially separate electronic recovery circuitry is customarily employed for the phase encoded data and the conventionally encoded data.

SUMMARY OF THE INVENTION

According to a feature of the invention, phase encoded data and conventionally encoded data, in particular modified NRZ data, are processed in such a manner that an appreciable amount of the electronic recovery circuitry involved can be utilized in common.

Specifically, a positive threshold detector, a negative threshold detector, and a bipolar peak detector are utilized in the recovery of both the modified NRZ data and part of the preamble of the phase encoded data. The read head signal is applied to the positive threshold detector, the negative threshold detector, and the bipolar peak detector. The output of the bipolar peak detector is combined in one AND circuit with the output of the positive threshold detector and in another AND circuit with the output of the negative threshold detector.

The bipolar peak detector is also employed to recover the phase encoded data per se. Accordingly, the output of the bipolar peak detector is combined in one AND circuit with a signal representing the amplitude of the positive going portion of the phase encoded read head signal and in another AND circuit with a signal representing the amplitude of the negative going portion of the phase encoded read head signal.

According to an aspect of the invention, the peak-to-peak amplitude of the read head signal is sensed in recovering the phase encoded data. By measuring the peak-to-peak amplitude of the read head signal, a representation of the phase encoded data is obtained that is less sensitive to variations in the peak amplitude and to any wandering of the read head signal. Specifically, the read head signal is first differentiated and then integrated separately over the half-cycles of the differentiated signal. The integrated signals are applied to threshold detectors, the outputs of which are combined in AND circuits with the output of the bipolar peak detector. Oppositely poled diodes couple the output of the differentiator to the inputs of the two integrators. These diodes each conduct during one-half cycle of the differentiated signal, thereby controlling the integrating intervals. Extraneous high frequency noise is suppressed by limiting the amplitude of the differentiated signal to that amplitude that triggers the threshold detectors for the minimum acceptable amplitude of the highest frequency component contained in the read head signal.

BRIEF DESCRIPTION OF THE DRAWINGS

The features of a specific embodiment of the invention are illustrated in the drawings, in which.

DESCRIPTION OF A SPECIFIC EMBODIMENT

Figure 1:
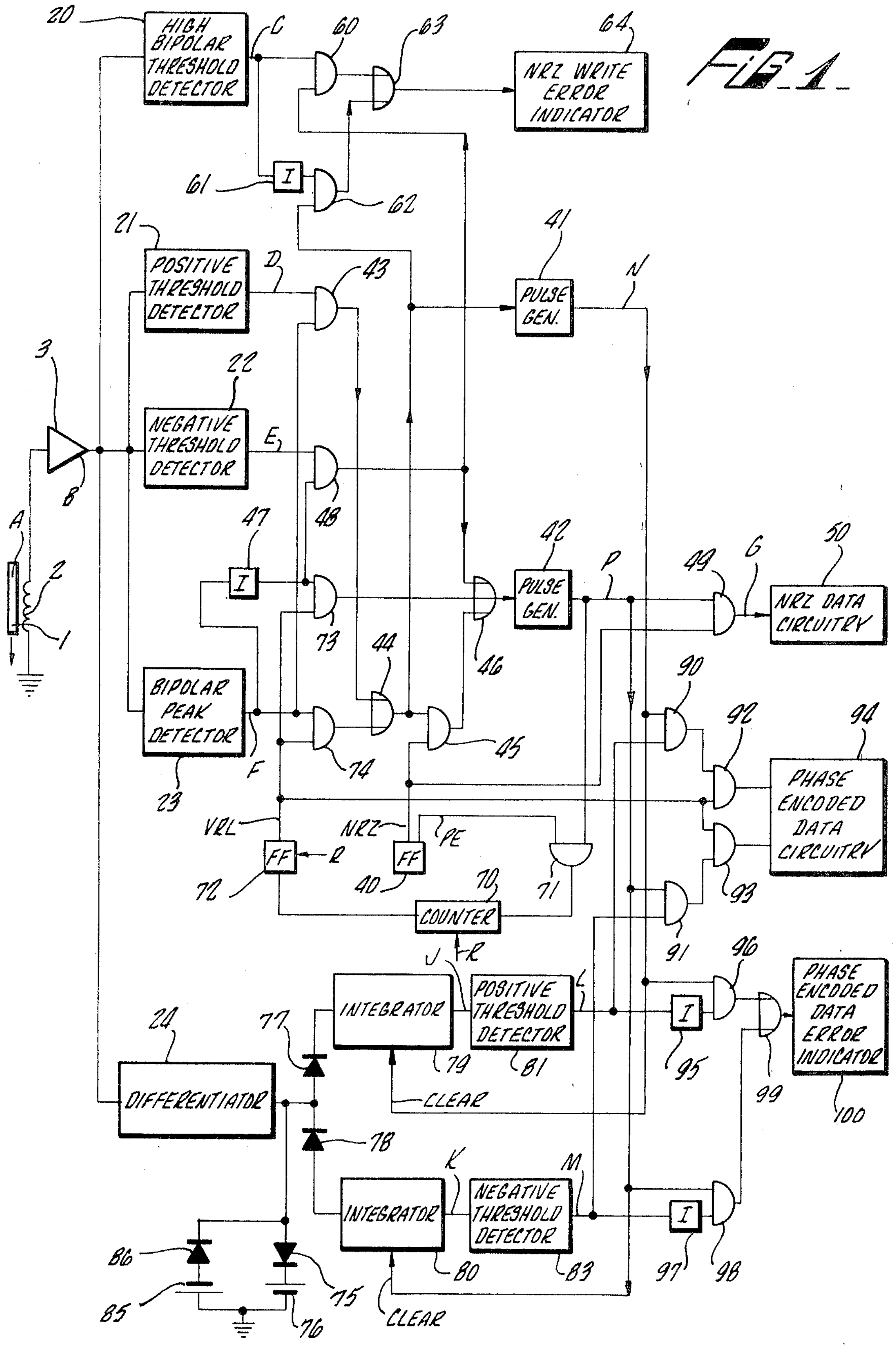
FIG. 1 is a schematic diagram in block form of electronic recovery circuitry for processing phase encoded and modified NRZ binary data.
Figure 2:
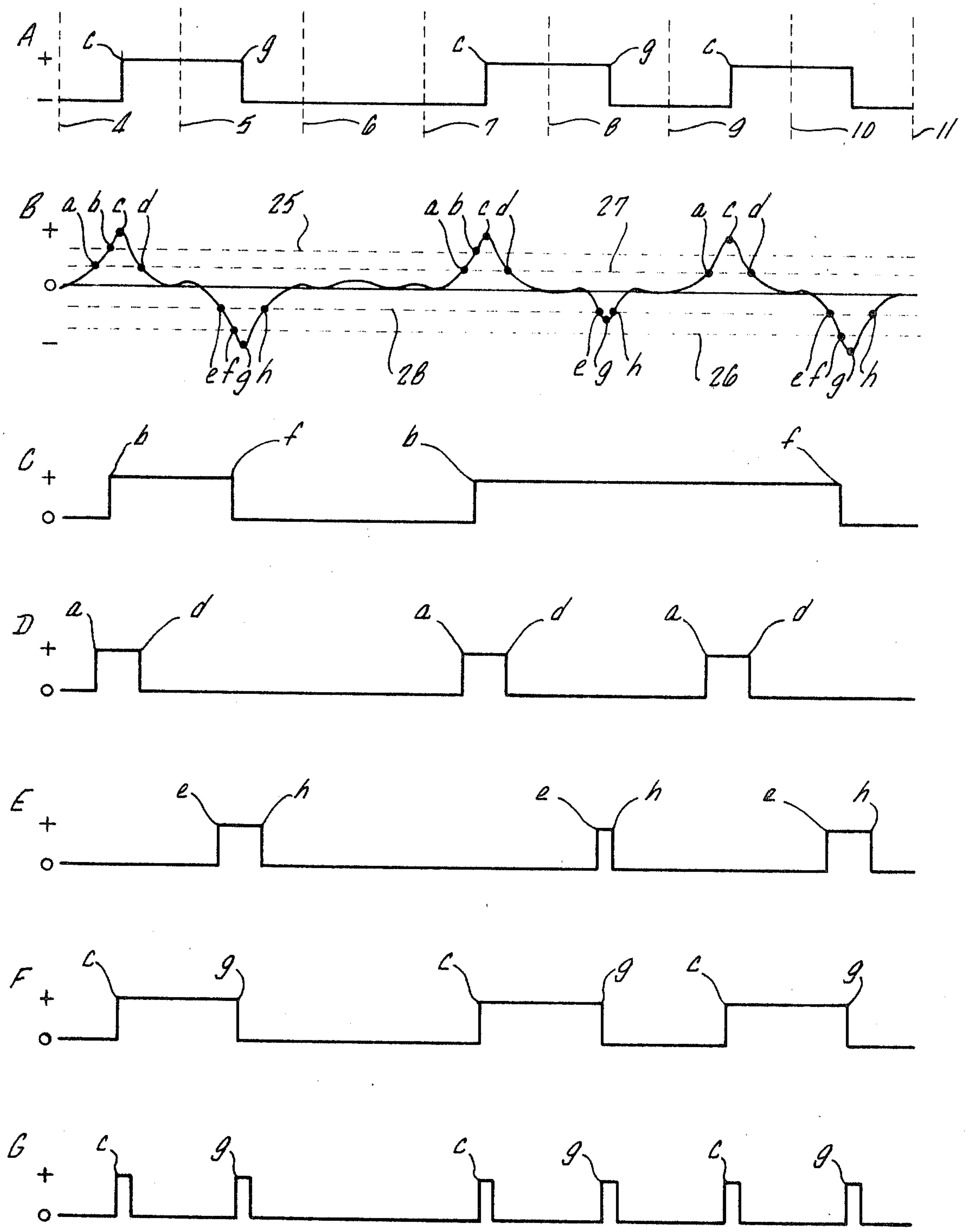
FIG. 2 represents typical wave forms as a function of time at different points in FIG. 1 while processing modified NRZ data.
Figure 3:
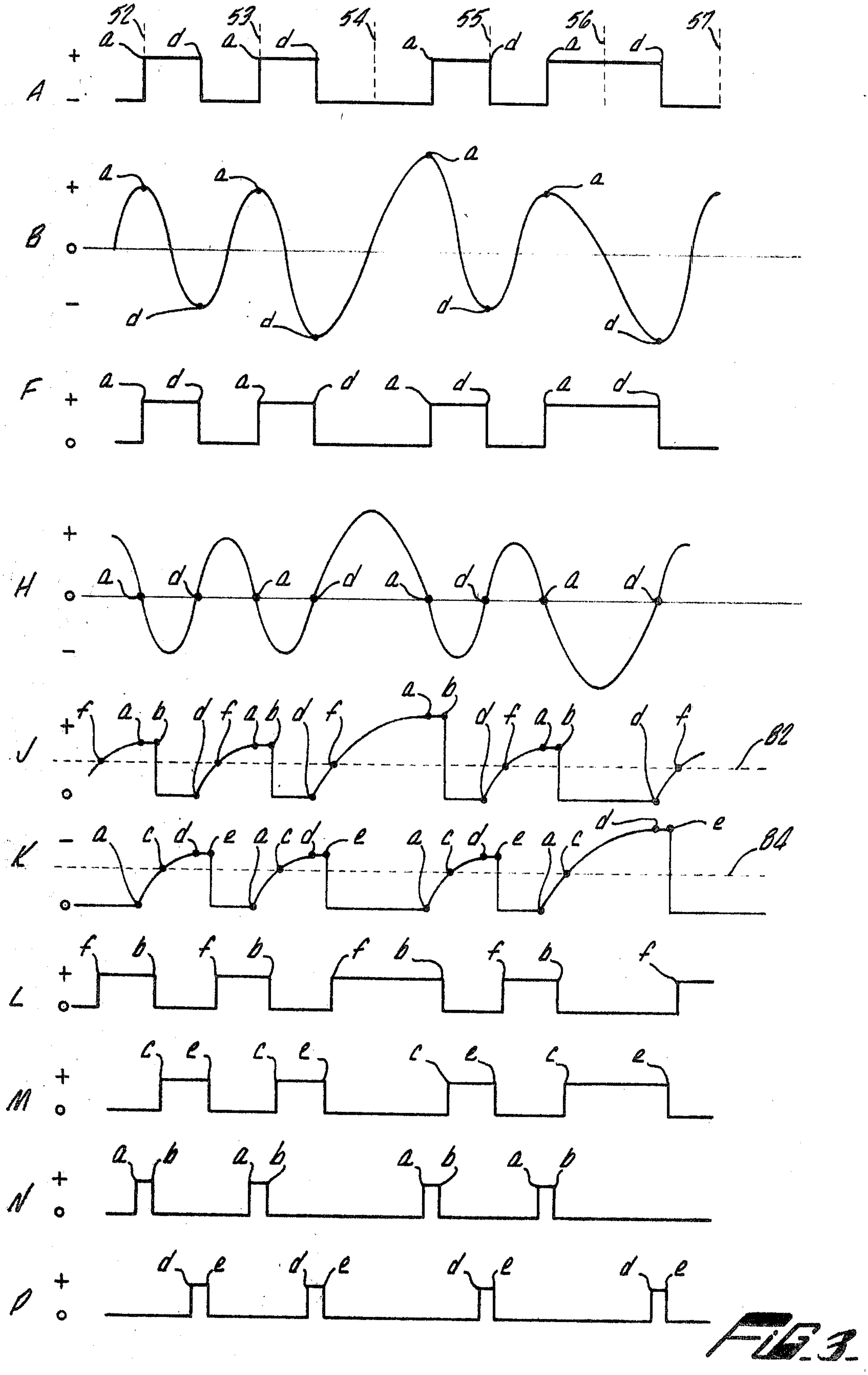
FIG. 3 represents typical wave forms as a function of time at different points in FIG. 1 while processing phase encoded data.

Reference is now made to FIG. 1 in which circuitry for recovering binary data is shown and to FIGS. 2 and 3 in which typical wave forms appearing at various points in the circuitry of FIG. 1 are shown. The points in FIG. 1 where the wave forms of FIGS. 2 and 3 appear are marked by capital letters corresponding to the capital letters designating the wave forms in FIGS. 2 and 3. In FIG. 1, a length of magnetic tape 1 is transported past a read head 2 by conventional means not shown. Responsive to flux changes on tape 1, read head 2 produces electrical signals that are applied to an amplifier 3.

The operation of the circuitry of FIG. 1 will first be described in connection with the processing of modified NRZ data as represented by the wave forms of FIG. 2. The orientation of the magnetic flux within 6-bit cells on the surface of tape 1 is represented in FIG. 2 by wave form A. The boundaries of the bit cells are marked by vertical dashed lines 4, 5, 6, 7, 8, 9, 10, and 11. The data recorded on tape 1 consists of the binary values 1101111. The binary value "1" is stored as a reversal in the orientation of flux at the center of a bit cell, and the binary value "0" is stored as the absence of a reversal in the orientation of flux at the center of a bit cell. The amplified read head signal, which comprises a pulse at each reversal in the orientation of the flux on tape 1, is represented in FIG. 2 by wave form B. The output of amplifier 3 is connected to the inputs of a high bipolar threshold detector 20, a positive threshold detector 21, a negative threshold detector 22, a bipolar peak detector 23, and a differentiator 24. Detectors 20 through 23 are instrumental in processing the NRZ read head signal and differentiator 24 is only used for phase encoded data. Detectors 20 through 23 convert the analog read head signal to binary signals which are employed for the remainder of the recovery operation. For the purposes of discussion, it is assumed that the two states of the binary signal are a predetermined positive level and ground.

The output of high bipolar threshold detector 20, which is represented by wave form C in FIG. 2, changes from ground to the positive level when the read head signal going positive from ground exceeds a high predetermined positive threshold level represented by dashed line 25 in wave form B of FIG. 2 and returns to ground when the read head signal going negative from ground exceeds a high predetermined negative threshold level represented by dashed line 26 in wave form B of FIG. 2. The points in time at which the read head signal crosses lines 25 and 26 are designated *b* and *f*, respectively, in FIG. 2. Detector 20 could be a Schmidt trigger circuit exhibiting a large hysteresis. In terms of wave form B of FIG. 2, the hysteresis of the Schmidt trigger circuit would be represented by the distance between lines 25 and 26. As illustrated by wave form B in FIG. 2, the negative pulse of the read head signal produced by the positive-to-negative reversal on tape 1 in the bit cell between lines 8 and 9 has insufficient amplitude to trigger threshold detector 20. As a result, the output of threshold detector 20 remains at the positive level until the amplitude of a negative pulse of the read head signal does exceed the negative threshold level represented by line 26. In the case of FIG. 2, this occurs in the bit cell between lines 10 and 11.

As represented by wave form D in FIG. 2, the output of positive threshold detector 21 is actuated and assumes the positive level when the read head signal going positive from zero exceeds a low predetermined positive threshold level represented in wave form B of FIG. 2 by a dashed line 27. The output of threshold detector 21 returns to ground when the amplitude of the read head signal drops below the threshold level represented by line 27. The read head signal crosses line 27 at points in time designated *a* and *d* in FIG. 2. As represented by wave form E in FIG. 2, the output of negative threshold detector 22 is actuated and assumes the positive level when the read head signal going negative from zero exceeds a low low predetermined negative threshold level represented in wave form B of FIG. 2 by a dashed line 28. The output of threshold detector 22 returns to ground when the amplitude of the read head signal drops below the threshold level represented by line 28. The read head signal crosses line 28 at points in time designated *e* and *h* in FIG. 2. Threshold detectors 21 and 22 could also be Schmidt trigger circuits that exhibit negligible hysteresis.

As represented by wave form F in FIG. 2, the output of bipolar peak detector 23 assumes the positive level at the positive peaks of the read head signal (points in time designated *c* in FIG. 2) and returns to ground at the negative peaks of the read head signal (points in time designated *g* in FIG. 2). Peak detector 23 could comprise a differentiator that differentiates the read head signal, a zero crossing detector that produces a pulse at the zero crossings of the differentiated signal, and a flip-flop triggered by the zero crossing pulses.

The AND circuits shown in FIG. 1 are assumed to operate on a positive level signal. Therefore, when both the inputs are at a positive level, the output is at a positive level and in all other cases the output is at ground. Similarly, the OR circuits shown in FIG. 1 are assumed to operate on a positive level signal. Therefore, when all the inputs of an OR circuit are at ground, its output is at ground, and when any input is at a positive level, its output is at a positive level.

A flip-flop 40 has an output lead designated NRZ that is at the positive level while NRZ data is being processed and a complementary output lead designated PE that is at the positive level while phase encoded data is being processed. The NRZ lead of flip-flop 40 is connected to one input of an AND circuit 45. The outputs of pulse generators 41 and 42 are normally at ground. Each assumes the positive level for a predetermined duration of time to form a pulse each time when its input undergoes a transition from ground to the positive level. The output of bipolar peak detector 23 is combined in an AND circuit 43 with the output of positive threshold detector 21. The output of AND circuit 43 is coupled through an OR circuit 44, AND circuit 45, and an OR circuit 46 to the input of pulse generator 42. Thus, at time *c*, the output of AND circuit 43 assumes the positive level and responsive thereto a fixed duration pulse represented by wave form G in FIG. 2 is produced at the output of pulse generator 42.

The output of bipolar peak detector 23 is also coupled through an inverter 47 to an AND circuit 48 where it is combined with the output of negative threshold detector 22. The output of inverter 47 is the opposite binary state from its input. Thus, when the output of peak detector 23 is at ground, the output of inverter 47 is at the positive level. When the output of peak detector 23, represented by wave form F in FIG. 2, drops from the positive level to ground at time *g*, the output of AND circuit 48, which is coupled through OR circuit 46 to pulse generator 42, rises to the positive level. Consequently, pulse generator 42 produces another fixed time duration pulse, as represented by wave form G in FIG. 2. In summary, each time the output of peak detector 23 changes state while the corresponding threshold detector (21 or 22) is actuated, a pulse is produced at the output of pulse generator 42, thereby designating a binary value "1."

The read head signal is discriminated by peak detector 23 on a time basis and by threshold detectors 21 and 22 on an amplitude basis. Accordingly, the outputs of AND circuits 43 and 48 provide a time and amplitude discriminated binary representation of the read head signal. Output lead NRZ of flip-flop 40 is coupled to one input of an AND circuit 49 to gate the pulses produced by pulse generator 42 to NRZ data circuitry 50 where they are decoded and utilized.

Since detectors 21 and 22 discriminate the amplitude of the read head signal in the course of the recovery of the data, their threshold levels, represented by lines 27 and 28 respectively in wave form B of FIG. 2, are as low as practicable. The threshold levels of detector 29, which are represented by lines 25 and 26 in wave form B of FIG. 2, are set at a much higher level than the threshold levels of detectors 21 and 22 to provide a check in the course of the writing operation. This check insures that the read head signal level produced by the information being written on tape 1 is sufficiently above the threshold level of threshold detectors 21 and 22 to allow for later degradation in the signal level. The output of bipolar threshold detector 20 is combined in an AND circuit 60 with the output of AND circuit 48, which changes from ground to the positive level at the negative peaks of the read head signal, i.e., at time *g*. As a result, the output of AND circuit 60 remains at ground as long as the amplitude of the negative pulses of the read head signal exceed the negative threshold level of detector 20. Similarly, the output of threshold detector 20 is coupled through an inverter 61 to an AND circuit 62 where it is combined with the output of OR circuit 44 which changes from ground to the positive level at the positive peaks of the read head signal, i.e., at time *c*. Therefore, the output of AND circuit 62 remains at ground as long as the amplitude of the positive pulses of the read head signal exceeds the positive threshold level of detector 20. The outputs of AND circuits 60 and 62 are coupled through an OR circuit 63 to an NRZ write error indicator 64. Any time a positive pulse of the read head signal falls between the positive threshold level of detector 20 and the positive threshold level of detector 21 or any time a negative pulse of the read head signal falls between the negative threshold level of detector 20 and the negative threshold level of detector 22, the output of OR circuit 63 changes from ground to the positive level and error indicator 64 is actuated. In such case, the information being checked would be rewritten on tape 1. In wave form B OF FIG. 2, the negative pulse of the read head signal in the bit cell between lines 8 and 9 fails to exceed the negative threshold level of detector 20 so the output of detector 20 does not change states at time *f* as is normally the case. Therefore, the input of AND circuit 60 from detector 20 is at the positive level when the input of AND circuit 60 from AND circuit 48 changes from ground to the positive level. Accordingly, error indicator 64 is actuated.

The operation of the circuitry of FIG. 1 in processing phase encoded data will now be considered in conjunction with the wave forms of FIG. 3. The orientation of the magnetic flux within 5-bit cells is represented in FIG. 3 by wave form A. The data consisting of the binary values 00110 is phase encoded on tape 1 in the form of nonreturn-to-zero pulses. The boundaries of the bit cells are marked by vertical dashed lines 52, 53, 54, 55, 56, and 57. The binary value "1" is stored as a negative-to-positive reversal in the orientation of flux at the center of a bit cell and the binary value "0" is stored as a positive-to-negative reversal in the orientation of flux at the center of a bit cell. The reversals in the orientation of flux occurring at the boundaries of the bit cells do not directly represent the recorded data. When the circuitry is processing phase encoded data, the NRZ lead of flip-flop 40 is at ground and the PE lead is at the positive level so no signal transmission takes place through AND circuit 45. In accordance with the common practice in recording phase encoded data, each block of phase encoded data on tape 1 is preceded by a preamble comprising series of binary "0's" recorded in a predetermined number of bit cells and followed by a similar postamble. Since the same binary value is recorded in each bit cell of the preamble, the characteristics of the read head signal produced by the preamble resemble the characteristics of the NRZ data read head signal for typical packing densities rather than the characteristics of the phase encoded data read head signal. In other words, it does not vary appreciably in peak amplitude or wander about the reference level like the phase encoded data read head signal does. A low threshold level is appropriate for phase encoded data because the variations in peak amplitude involved are large and its narrow band width permits limited noise to mix with the signal. On the other hand, a high threshold level is appropriate for modified NRZ data because the variations in peak amplitude are small and its wide band width permits much noise to mix with the signal. A high threshold level is also appropriate for the preamble of the phase encoded data because the variations in peak amplitude are small and much noise may precede the beginning of the preamble due to the lack of recording on the tape. If the phase encoded threshold level were used for the preamble, the noise on the tape preceding the preamble would in many cases produce a signal that exceeds the threshold level and gives a false indication of the start of the preamble. Thus, the recovery circuitry for processing the modified NRZ data is also employed to sense the start of the preamble of the phase encoded data. Positive threshold detector 21, negative threshold detector 22, bipolar peak detector 23, AND circuit 43, AND circuit 48, AND circuit 45, OR circuit 44, OR circuit 46, and pulse generator 42 process the beginning of the preamble of each block of phase encoded data in the fashion described above in connection with the processing of the NRZ data. After a predetermined number of pulses are produced at the output of pulse generator 42 in response to the preamble of a block of phase encoded data, it is established with a certain degree of probability that the preamble of a block of phase encoded data is in fact being read as distinguished from noise. Then, the circuitry of FIG. 1 is converted to operate upon a phase encoded read head signal. This is accomplished by coupling the output of pulse generator 42 to a counter 70 through an AND circuit 71 that is energized by the PE output lead of flip-flop 40. After the predetermined number of pulses is produced by pulse generator 42, counter 70 produces a pulse that sets a flip-flop 72, thereby energizing its output lead VRL. The transition of lead VRL from ground to the positive level signifies that a valid record level has been sensed. Lead VRL is combined in an AND circuit 74 with the output of bipolar peak detector 23 and in an AND circuit 73 with the inverse of the output of peak detector 23. After a valid record level is indicated and lead VRL is at a positive level, AND circuit 73 and 74 override AND circuits 43 and 48. In other words, the outputs of OR circuits 44 and 46 change from ground to the positive level each time that bipolar peak detector 23 senses the peak of a positive pulse and a negative pulse respectively of the read head signal regardless of whether the read head signal exceeds the threshold level of detectors 21 and 22. A fixed duration pulse is therefore produced at the output of pulse generator 42 for the negative pulses of the read head signal, and fixed duration pulses are produced at the output of pulse generator 41 for the positive pulses of the read head signal. After the end of the postamble of each block is sensed, tape transport is stopped until the tape handling equipment is given a command to read another block. At the same time, counter 70 and flip-flop 72 are reset for sensing the start of the preamble of the next block.

The pulses generated by pulse generators 41 and 42 represent the read head signal discriminated on a time basis. As illustrated by wave form B in FIG. 3, the phase encoded read head signal varies substantially in peak amplitude and wanders about the zero level. For these reasons, the peak-to-peak amplitude of the phase encoded read head signal is sensed as the basis for amplitude discrimination. To this end, the phase encoded read head signal is applied to differentiator 24. As represented by wave form H in FIG. 3, the differentiated signal has zero crossings (at times *a* and *d*) that correspond in time to the peaks of the read head signal. The maximum amplitude of the output of differentiator 24 is symmetrically limited by the series combination of a battery 85 and a diode 86 connected in parallel with a diode 75 and a battery 76. The voltage across batteries 85 and 76 determines the amplitude limit at the output of differentiator 24. The purpose of limiting the output of differentiator 24 and the criterion for determining the amplitude at which limiting commences is described in detail below. Oppositely poled diodes 77 and 78 connect the output of differentiator 24 to the input of integrators 79 and 80 respectively.

By virtue of diode 77, integrator 79 integrates only over positive half cycles of the differentiated signal, as represented by wave form J in FIG. 3. Since the output of integrator 79 at the negative going zero crossing of the differentiated signal (time *a*) represents the integral of the positive half-cycle of the differentiated signal, it also represents the positive going peak-to-peak amplitude of the read head signal itself. The output of pulse generator 41 is applied to the CLEAR input of integrator 79, which is cleared responsive to the end of each pulse produced by pulse generator 41 (at time *b*). The output of integrator 79 falls to ground each time it is cleared where it remains until the next positive half-cycle of the differentiated signal (at time *d*). Thus, the positive half-cycles of the differentiated signal are individually integrated. The output of integrator 79 is applied to the input of a threshold detector 81. The output of threshold detector 81 remains at ground until the signal applied to its input exceeds a predetermined positive threshold level represented in wave form J of FIG. 3 by a dashed line 82, at which time its output assumes the predetermined positive level. As represented by wave form L in FIG. 3, the output of threshold detector 81 rises to the positive level (at time *f*) each time the output of integrator 79 exceeds the threshold level and drops back to ground each time integrator 79 is cleared (at time *b*).

By virtue of diode 78, integrator 80 integrates only over negative half-cycles of a differentiated signal as represented by wave form K in FIG. 3. Since the output of integrator 80 at the positive going zero crossing of the differentiated signal (time *d*) represents the integral of the negative half-cycle of the differentiated signal, it also represents the negative going peak-to-peak amplitude of the read head signal itself. The output of pulse generator 42 is applied to the CLEAR input of integrator 80, which is cleared responsive to the end of each pulse produced by pulse generator 72 (at time *e*). The output of integrator 80 falls to ground each time it is cleared, where it remains until the next negative half-cycle of the differentiated signal (at time *a*). The output of integrator 80 is applied to the input of a threshold detector 83. The output of threshold detector 83 remains at ground until the signal applied to its input exceeds a predetermined negative threshold level, represented in wave form K of FIG. 3 by a dashed line 84, at which time its output assumes the predetermined positive level. As represented by wave form M in FIG. 3, the output of threshold detector 83 rises to the positive level (at time *c*) each time the output of integrator 80 exceeds the threshold level and drops back to ground each time integrator 80 is cleared (at time *e*).

The amplitude of the frequency response of a differentiator rises as the frequency increases. To offset this, the output of differentiator 24 is symmetrically limited by diodes 86 and 75 and batteries 85 and 76 such that its maximum amplitude is that amplitude required to trigger threshold detectors 81 and 83 when a signal of the minimum acceptable amplitude at the frequency of the highest frequency component of the read head signal is applied to the input of differentiator 24. For a phase encoded read head signal, the highest frequency component would be substantially the frequency of occurrence of the bit cells. In this way, the output of differentiator 24 is limited to the maximum amplitude of interest in processing the phase encoded read head signal. Since discrimination is made on a time amplitude basis, high frequency noise is suppressed by limiting. The effect of this limiting is to confine the band width of the amplitude discriminating circuitry to the highest frequency component of interest of the read head signal.

Threshold detectors 81 and 83 could be Schmidt trigger circuits having negligible hysteresis. Integrators 79 and 80 could comprise capacitors that are charged responsive to the half-cycle of the differentiated signal to be integrated and discharged responsive to the signal applied to the CLEAR input.

The output of positive threshold detector 81 is combined in an AND circuit 90 with the output of pulse generator 41. Similarly, the output of negative threshold detector 83 is combined in an AND circuit 91 with the output of pulse generator 42. The outputs of AND circuits 90 and 91 are coupled through AND circuits 92 and 93 respectively, which are energized by the VRL output of flip-flop 72, to phase encoded data circuitry 94. The outputs of AND circuits 90 and 91 normally comprise series of pulses like those represented in wave forms N and P, respectively, of FIG. 3. The pulses at the output of AND circuit 92 occurring at the middle of the bit cell represent data, namely the binary value "1." Similarly, the pulses at the output of the AND circuit 93 occurring at the center of bit cells represents data, namely the binary value "0." The pulses at the output of AND circuits 92 and 93 occurring at the boundaries of bit cells represent flux reversals on tape 1 inherent in the nature of phase encoded data but not signifying data. Circuitry 94 separates the data pulses from the phase pulses so the data can be decoded and utilized. Circuitry 94 preferably includes the arrangement disclosed and claimed in U.S. Pat. application Ser. No. 888,144 by Chia-Cheng King, Arnold Jorgensen and Michael I. Behr, entitled "Binary Data Handling System," which is assigned to the assignee of the present application.

The output of threshold detector 81 is also coupled through an inverter 95 to the input of an AND circuit 96 where it is combined with the output of pulse generator 41. Likewise, the output of threshold detector 83 is also coupled through an inverter 97 to an AND circuit 98 where it is combined with the output of pulse generator 42. The outputs of AND circuits 96 and 98 are connected through an OR circuit 99 to a phase encoded data error indicator 100. Any time the peak-to-peak amplitude of the read head signal is insufficient to trigger threshold detector 81 or 83 at the corresponding peaks of the read head signal, a fixed duration pulse from pulse generator 41 or 42 is transmitted through an AND circuit (96 or 98) and OR circuit 99 to actuate error indicator 100. During a write check operation, the actuation of error indicator 100 shows the phase encoded data that was recorded on tape 1 fails to provide a sufficient read head signal level. In such case, the phase encoded data would be rewritten on tape 1. In a read operation, the actuation of error indicator 100 shows that the data in a bit cell has been lost. In such case, an attempt would be made to reconstruct the data by means of parity information.

Although the invention has been described in connection with magnetic tape, it is applicable as well to the recovery of data stored on other types of mediums such as magnetic drums or discs.

We claim:

1. A binary data handling system comprising:
a magnetic read head for producing a first signal representative of data stored on a magnetic surface;
a positive threshold detector for generating a second signal to indicate that the first signal exceeds the threshold level of the positive threshold detector;
a negative threshold detector for generating a third signal to indicate that the first signal exceeds the threshold level of the negative threshold detector;
peak detecting means for producing an indication of the positive and negative peaks of first signal;
means for connecting the read head to the inputs of the positive threshold detector, the negative threshold detector, and the peak detecting means;
means responsive to each coincidence of the second signal and the positive peak indication of the peak detecting means for generating a pulse;
means responsive to each coincidence of the third signal and the negative peak indication of the peak detecting means for generating a pulse;
threshold detecting means responsive to the first signal for generating a first indication that the first signal has exceeded a positive threshold level more positive than the threshold level of the positive threshold detector and for generating a second indication that the first signal has exceeded a negative threshold level more negative than the negative threshold level of the negative threshold detector;
an error indicator actuated in response to the coincidence of the second signal, the positive peak indication of the peak detecting means, and the second indication of the threshold detecting means, and actuated in response to the coincidence of the third signal, the negative peak indication of the peak detecting means and the first indication of the threshold detecting means;
a utilization circuit; and
means for coupling the generated pulses to the utilization circuit.

2. The system of claim 1, in which the bipolar threshold detector is a Schmidt trigger circuit with hysteresis corresponding to the amplitude between the higher positive threshold level and the higher negative threshold level.

3. The system of claim 1, in which the positive threshold detector and the negative threshold detector are Schmidt trigger circuits with negligible hysteresis.

4. The data handling system of claim 1, in which the threshold detecting means is a bipolar threshold detector having a single bistable output that assumes one state for the first indication and another state for the second indication.

5. The data handling system of claim 1, in which the peak detecting means is a bipolar peak detector.

6. A binary data handling system comprising:
a source of binary data;
a first circuit for processing modified NRZ data, the first circuit including a positive threshold detector, a negative threshold detector, and a bipolar peak detector whose inputs are connected together, first means responsive to each coincidence of the actuation of the positive threshold detector and the positive peak indication of the peak detector for generating a pulse, and second means responsive to each coincidence of the actuation of the negative threshold detector and a negative peak indication of the peak detector for generating a pulse;
a second circuit for processing phase encoded data;
a utilization circuit connected to the output of the first circuit and the output of the second circuit;
means while the source is producing a signal representative of modified NRZ data for coupling the source to the first circuit such that the signal applied to the utilization circuit represents the conventionally encoded data as processed by the first circuit;
means while the source is producing the phase encoded data including its preamble for coupling the source to the first circuit before each occurrence of the preamble; and
means while the source is producing phase encoded data for coupling the source to the second circuit including circuitry for operating the first and second means of the first circuit to generate pulses at each peak indication of the peak detector irrespective of the actuation of the positive and negative threshold detectors and means for connecting the second circuit to the utilization device.

7. A binary data handling system comprising:

a source of binary data;

a first circuit for processing conventionally encoded data;

a second circuit for processing phase encoded data;

a utilization circuit connected to the output of the first circuit and the output of the second circuit;

means while the source is producing a signal representative of conventionally encoded data for coupling the source to the first circuit such that the signal applied to the utilization circuit represents the conventionally encoded data as processed by the first circuit;

means while the source is producing the phase encoded data including its preamble for coupling the source to the first circuit before each occurrence of the preamble; and means while the source is producing phase encoded data for coupling the source to the second circuit responsive to the sensing by the first circuit of the existence of the preamble such that the signal applied to the utilization circuit represents the phase encoded data as processed by the second circuit.

8. The system of claim 7, in which the means for coupling the source to the second circuit is responsive to the count by the first circuit of a predetermined number of pulses in the preamble.

9. A binary data handling system comprising:

first means for producing a signal representative of binary data;

second means coupled to the signal producing means for producing a first level when the data representative signal is below a positive threshold level and producing a second level when the data representative signal is above the positive threshold level;

a third means coupled to the signal producing means for producing a first level when the data representative signal is below a negative threshold level and for producing a second level when the data representative signal is above the negative threshold level;

fourth means coupled to the signal producing means for producing a transition form a first level to a second level at positive peaks of the data representative signal and for producing a transition form the second level to the first level at negative peaks of the data representative signal;

fifth means responsive to the coincidence of the production of the second level by the second means and a transition from the first level to the second level by the fourth means for generating a pulse and the coincidence of the production of the second level by the third means and a transition from the second level to the first level by the fourth means for producing a pulse;

sixth means responsive to the signal producing means for generating a first indication that the signal representative of binary data has exceeded a positive threshold level more positive than the threshold level of the second means and for generating a second indication that the signal representative of the binary data has exceeded a negative threshold level more negative than the threshold level of the third means; and an error indicator actuated in response to the coincidence of the first level produced by the second means, the second level produced by the fourth means, and the second indication of the sixth means, and actuated in response to the coincidence of the first level produced by the third means, the first level produced by the fourth means, and the first indication of the sixth means.

PO-1050
(5/69)

UNITED STATES PATENT OFFICE
CERTIFICATE OF CORRECTION

Patent No. 3,581,297 Dated May 25, 1971

Inventor(s) Michael I. Behr, Lewis B. Coon, Jr., Charles E. Bickel

It is certified that error appears in the above-identified patent and that said Letters Patent are hereby corrected as shown below:

In the ABSTRACT, line 21, "differential" should be --differentiated--;

Col. 1, line 25, "regard peak" should be --regard to peak--;

Col. 1, line 29, "FAn" should be -- An --.

Col. 3, line 26, "a low low predetermined" should be --a low predetermined--;

Col. 4, line 22, "detector 29" should be --detector 20--;

Col. 4, line 54, "OF" should be --of--;

In claim 9, at col. 10, line 1, "a" should be deleted;
at col. 10, line 7, "form" should be --from--;
at col. 10, line 9, "form" should be --from--.

Signed and Sealed this

Sixteenth Day of November 1976

[SEAL]

*Attest:*

RUTH C. MASON
*Attesting Officer*

C. MARSHALL DANN
*Commissioner of Patents and Trademarks*